United States Patent
Wu et al.

(10) Patent No.: US 7,605,904 B2
(45) Date of Patent: Oct. 20, 2009

(54) LIQUID CRYSTAL DISPLAY PANEL HAVING A CELL TEST STRUCTURE AND METHOD FOR MAKING THE SAME

(75) Inventors: Hsin-Tai Wu, Chang-Hua Hsien (TW); Chao-Liang Lu, Taoyuan (TW); Chih-Hsiang Yang, Tao-Yuan Hsien (TW); Kuo-Chih Lee, Tainan County (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 12/110,355

(22) Filed: Apr. 28, 2008

(65) Prior Publication Data

US 2008/0198286 A1 Aug. 21, 2008

Related U.S. Application Data

(62) Division of application No. 10/710,932, filed on Aug. 13, 2004, now Pat. No. 7,388,626.

(30) Foreign Application Priority Data

Jun. 1, 2004 (TW) .............................. 93115674 A

(51) Int. Cl.
*G02F 1/13* (2006.01)
(52) U.S. Cl. ............................. 349/192; 349/54; 349/40
(58) Field of Classification Search ................ 349/192, 349/40, 106, 149–152, 187, 54; 345/93
See application file for complete search history.

(56) References Cited

U.S. PATENT DOCUMENTS 6,025,891 A 2/2000 Kim
6,392,719 B2 5/2002 Kim
7,129,998 B2 10/2006 Ohgiichi

*Primary Examiner*—Thoi V Duong
(74) *Attorney, Agent, or Firm*—Winston Hsu

(57) ABSTRACT

The present invention relates to a liquid crystal display panel having a cell test structure and a method for making the same. The liquid crystal display panel includes a substrate having a plurality of first driving IC mounting areas, a plurality of first conductive wires located on the substrate, a plurality of second conductive wires that are parallel and interlaced with the first conductive wires, a first shorting bar connected to the first conductive wires and passing through all of the first driving IC mounting areas, and a second shorting bar connected to the second conductive wires and passing through all of the first driving IC mounting areas.

13 Claims, 7 Drawing Sheets

LIQUID CRYSTAL DISPLAY PANEL HAVING A CELL TEST STRUCTURE AND METHOD FOR MAKING THE SAME

CROSS REFERENCE TO RELATED APPLICATIONS

This application is a division of application Ser. No. 10/710,932 filed on Aug. 13, 2004.

BACKGROUND OF THE INVENTION

1. Field of the Invention

The present invention generally relates to a liquid crystal display and a method of producing the same, and more particularly, to a method for the liquid crystal display having this structure to more conveniently perform a cell test.

2. Description of the Prior Art

Thin film transistor liquid crystal displays are made up of array-arranged thin film transistors, suitable capacitors, bonding pads and other electrical devices to drive dot pixels and further produce rich and colorful images. Since thin film transistor liquid crystal displays have the advantages of having a small volume, having low power consumption, and being radiation free, they have been widely applied to laptops, PCs and personal digital portable information products, and have tended to replace the traditional CRT monitors of desktop PCs.

As shown in FIG. 1, a liquid crystal display 10 comprises a bottom substrate 12 and a top substrate 14 positioned on top of the bottom substrate 12. A liquid crystal molecular layer (not shown) is filled between the top substrate 14 and the bottom substrate 12, wherein the top substrate is indicated by a dotted line to prevent confusion. Additionally, the liquid crystal display 10 includes a plurality of scanning lines 16 and data lines 18, each scanning line 16 and data line 18 is positioned on the bottom substrate 12, and each scanning line is perpendicular to each data line 18. On the other hand, the top substrate 14 is a color filter for displaying the color images of the liquid crystal display 10.

In addition, as FIG. 1 shows, the bottom substrate 12 includes at least one scanning line driving IC mounting area 20 for installing a scanning line driving IC (not shown), and a plurality of data line driving IC mounting areas 22 for installing data line driving ICs (not shown), wherein the scanning line driving ICs output a clock signal to each scanning line 16, and each data line driving IC output image information to each data line 18. Furthermore, as FIG. 2 shows, each data line driving IC mounting area 22 includes a shorting bar 24 and a plurality of bonding pads 26, wherein each data line 18 at the data line driving IC mounting area connects to the shorting bar 24, and each bonding pad 26 is for bonding each bump of data line driving IC on. Moreover, since the internal structure of the scanning line driving IC mounting area 20 is similar to each data line driving IC mounting area 22, the structure description is omitted.

In general, before each data line driving IC and each scanning line driving IC are bonded on each data line driving IC mounting area 22 and scanning line driving IC mounting area 20, a cell test of a liquid crystal display 10 is performed in order to check in advance whether any abnormal color image exists. When the liquid crystal cell test is completed, a laser is utilized to cut off the connection between shorting bar 24 and each data line 18, followed by bonding each data line driving IC on each data line driving IC mounting area 22, and bonding the scanning line driving IC on the scanning line driving IC mounting area 20.

Moreover, in the aforementioned cell test, the shorting bar 24 is utilized for inputting a test signal to each data line 18, followed by checking the color image of the LCD 10 artificially. The shorting bar 24 has to connect to a test pad to receive the test signal. Therefore the signal can pass through the test pad to the shorting bar 24. However, as FIG. 2 shows, each bonding pad 26 occupies most of the space of the data line driving IC mounting area 22, therefore there is not enough space for installing a test pad for shorting bar 24 at the data line driving IC mounting area. Besides, even though the test pad is installed outside of the data line driving IC mounting area 22, the shorting bar 24 cannot be extended to the outside of data line driving IC mounting area 22 due to the short distance d between two neighboring bonding pads 26.

FIG. 3 is a schematic diagram of a conventional cell test. As FIG. 3 shows, the prior cell test generally attaches a conductive elastic 28 to the surface of each shorting bar 24. Thereafter a test signal is input to the conductive elastic 28, and the test signal passes through the shorting bar 24 to each data line 18. However, accordingly, the cell test inputs the same signals to each data line 18. Hence the red dot pixels, green dot pixels and blue dot pixels cannot be tested individually. Therefore, some defects cannot be found and the operators are not able to gain the complete defect information.

SUMMARY OF THE INVENTION

It is therefore one object of the present invention to provide a liquid crystal display for performing a convenient cell test.

Another object of the present invention is to provide a method for producing a liquid crystal display to solve the aforementioned problem.

In accordance with the first object of the present invention, there is provided a liquid crystal display comprising a first substrate, a plurality of first and second conductive wires in parallel and interlaced on the first substrate, a first shorting bar connected to the first conductive wires and a second shorting bar connected to the second conductive wires. Additionally, the first surface of the substrate includes a plurality of a plurality of first diving IC mounting areas for installing the first driving ICs separately. The first conductive wires and the second conductive wires are for receiving the signals from the first driving ICs, and the first and the second shorting bars pass through the first driving IC mounting areas.

According to the present invention, a first substrate and a second substrate are prepared, the first substrate comprising a plurality of first conductive wires and a plurality of first shorting bars connected to the first conductive wires. After the first shorting bars are utilized to perform the cell test, a cutting process is carried out to disconnect to connection between the first shorting bars and the first conductive wires. Thereafter, a plurality of first driving ICs is bonded on the first substrate and the shorting bars are connected to the first driving ICs in series, wherein the first driving IC is for outputting signals to the first conductive wires.

According to the present invention, the shorting bars have the advantages of performing a cell test and connecting to the driving ICs in series so that the invention can reduce the number of conductive wires and reach the efficacy of saving space.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
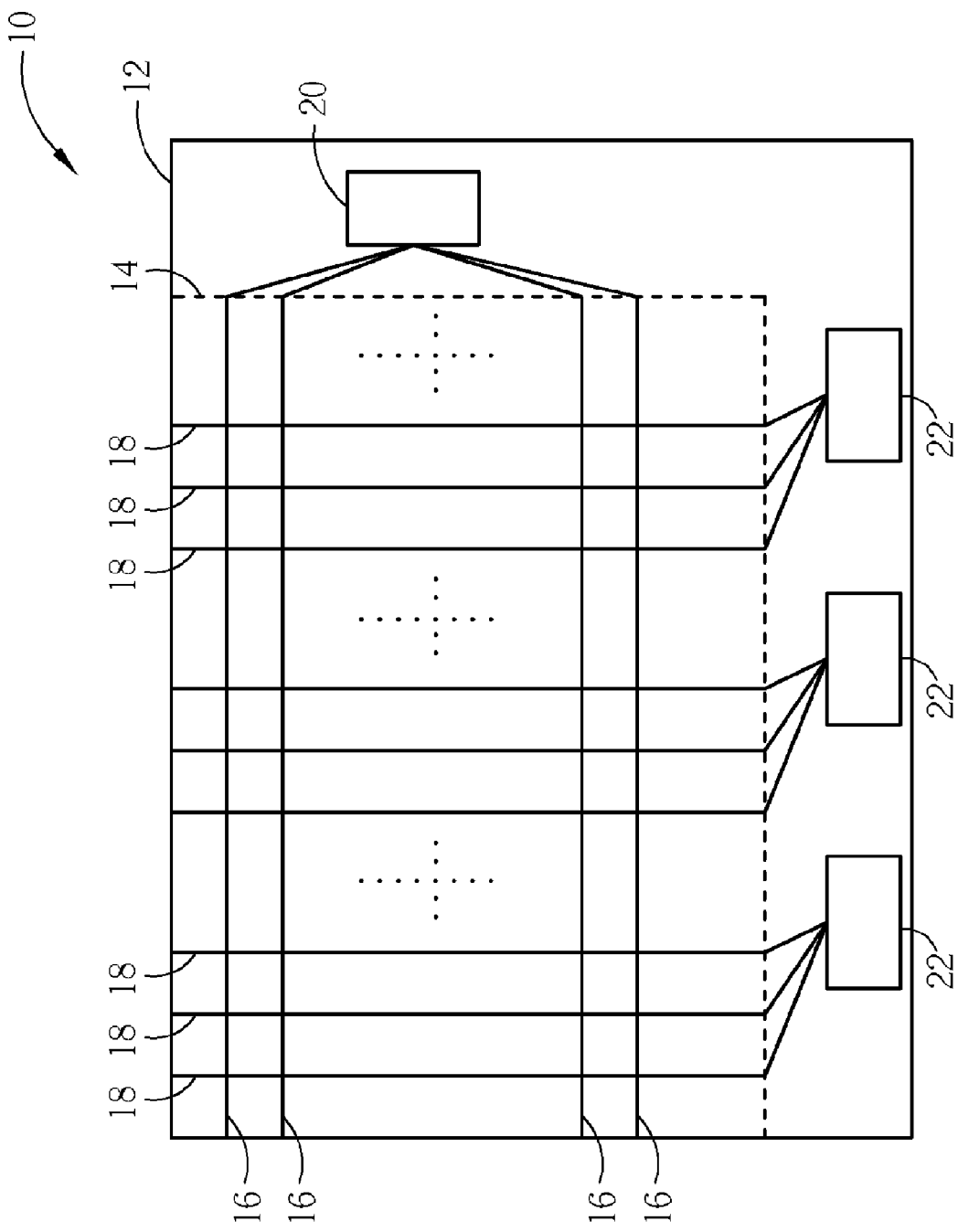
FIG. 1 is a schematic diagram of a liquid crystal display.
Figure 2:
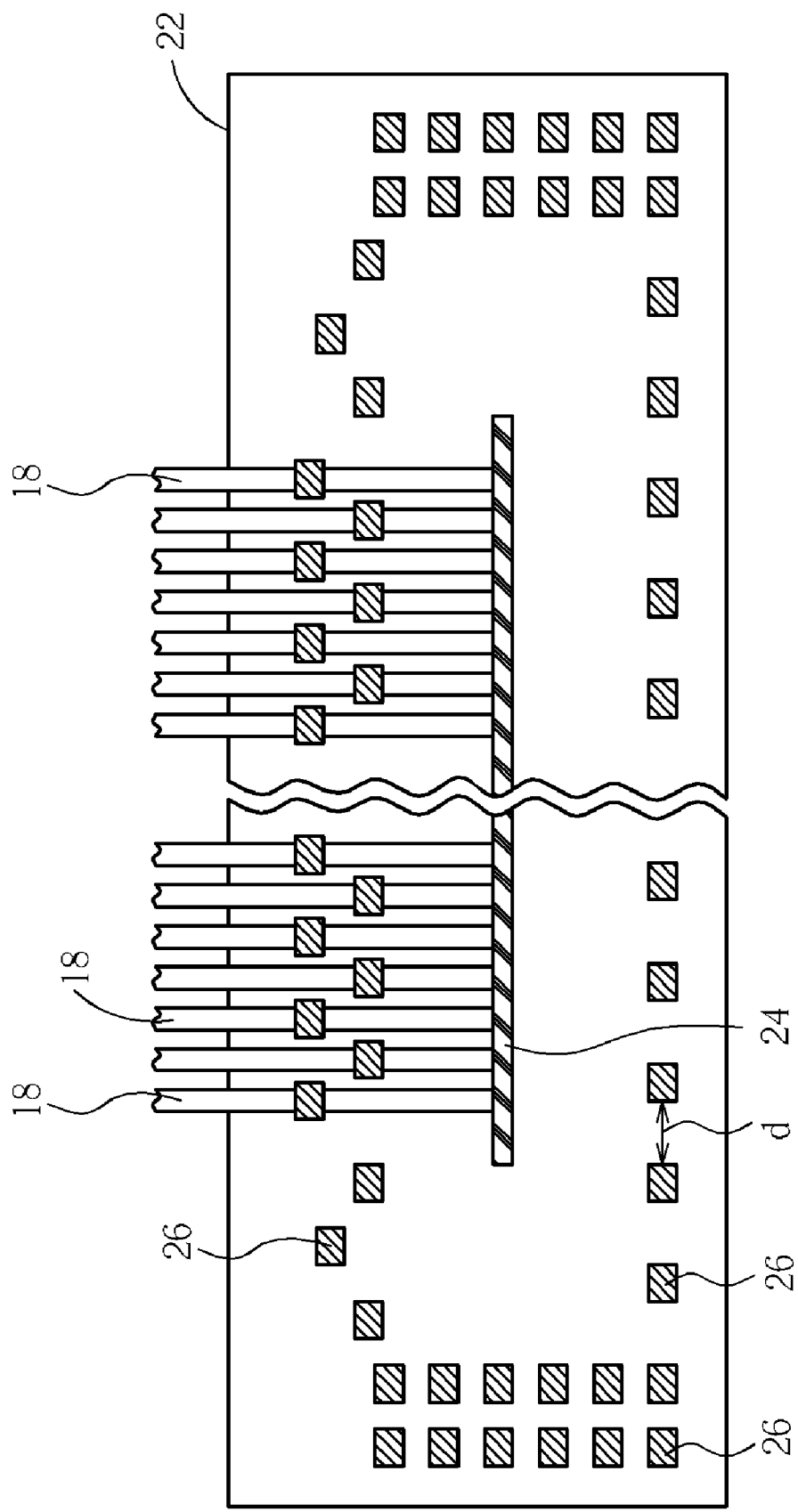
FIG. 2 is an internal schematic diagram of a data line driving IC mounting area.
Figure 3:
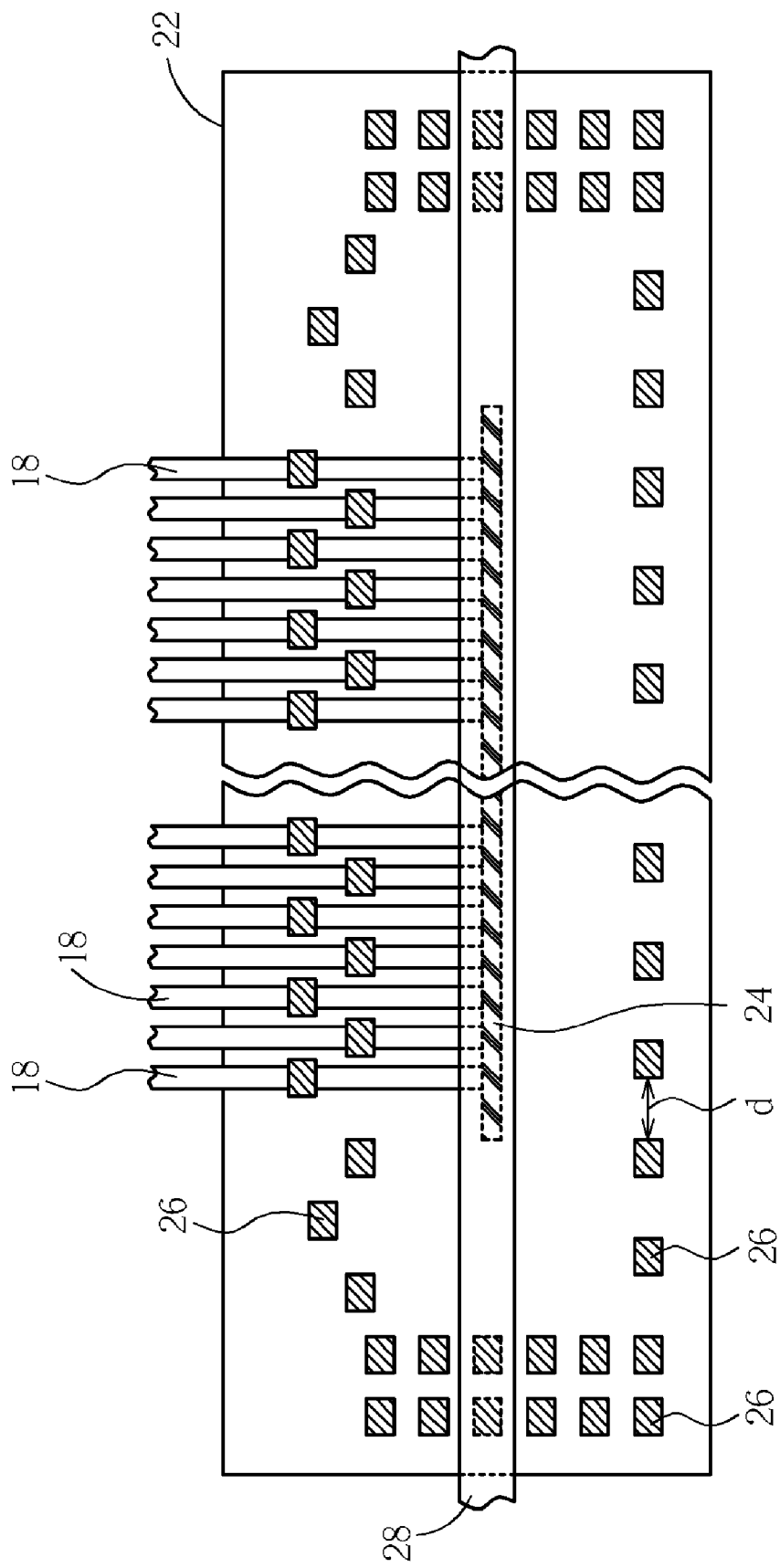
FIG. 3 is a schematic diagram of a conventional cell test.
Figure 4:
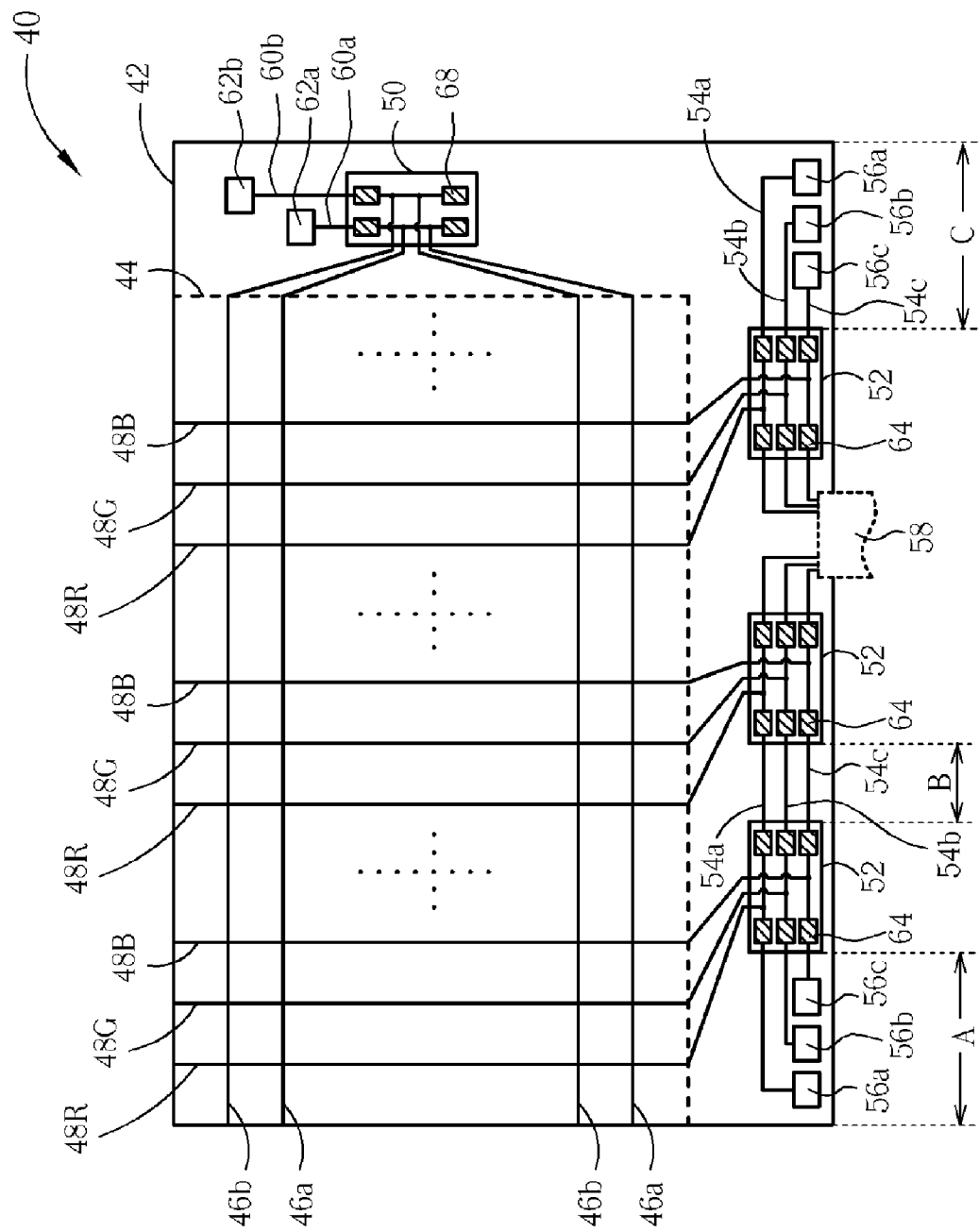
FIG. 4 is a schematic diagram of a liquid crystal display according to the first embodiment of the present invention.

As shown in FIG. 4, a liquid crystal display 40 comprises a bottom substrate 42 and a top substrate 44 positioned on the bottom substrate. A liquid crystal molecular layer (not shown) is filled between the top substrate 44 and the bottom substrate 42, wherein the top substrate 44 is shown by dotted lines to avoid confusion. Additionally, the liquid crystal display 40 includes a plurality of scanning lines 46a formed in parallel with or interlaced with a plurality of scanning lines 46b, each scanning line 46a and 46b being formed on the bottom substrate 42. Moreover, the liquid crystal display 40 includes a plurality of data lines 48R installed on the bottom substrate 42 for transmitting red image signals, a plurality of data lines 48G positioned on the bottom substrate 42 for transmitting green image signals and a plurality of data lines 48B positioned on the bottom substrate for transmitting blue image signals. On the other hand, the top substrate is a color filter for displaying the color image of liquid crystal display 40.

Figure 5:
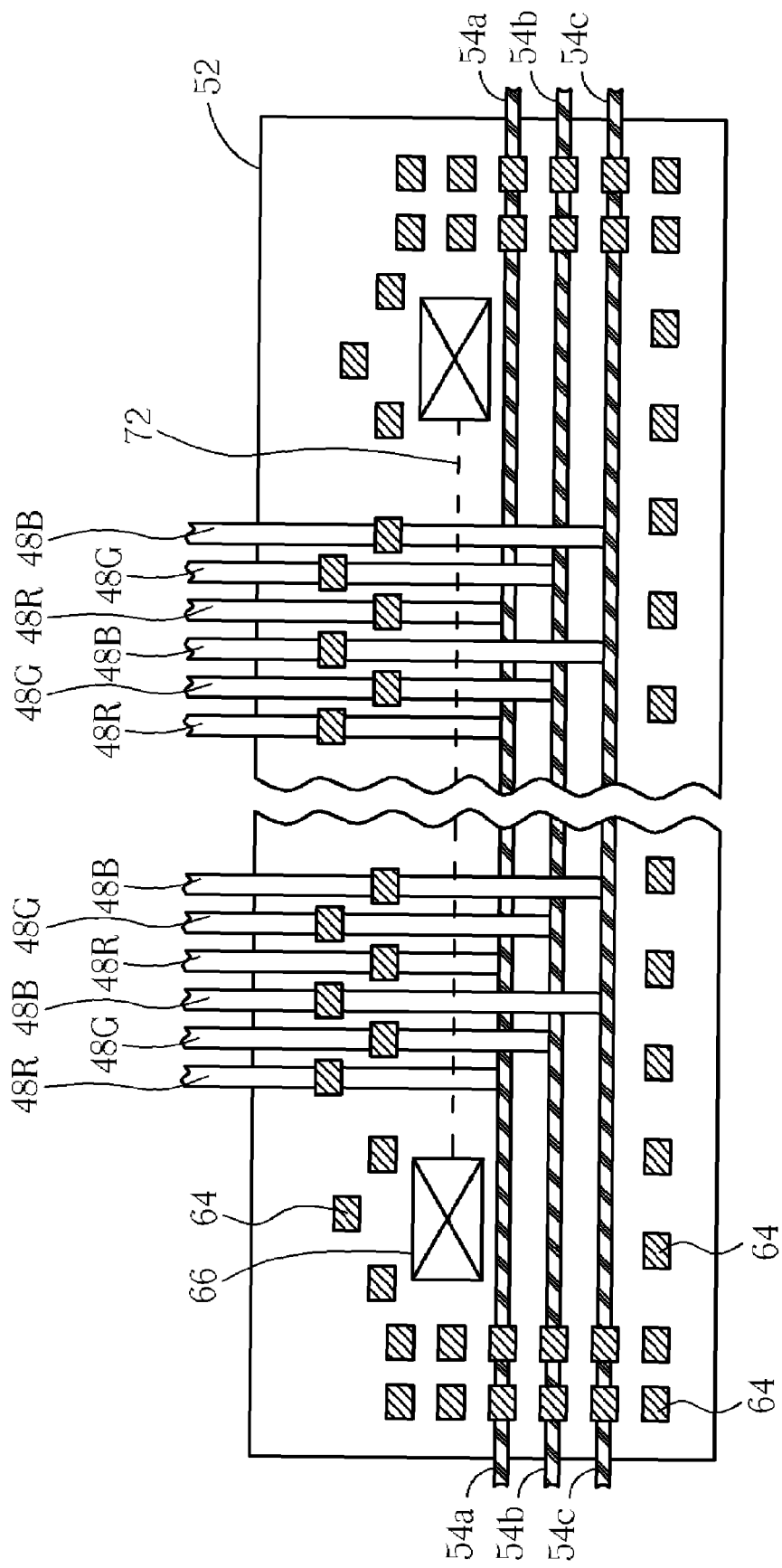
FIG. 5 is an internal schematic diagram of the data line driving IC mounting area in FIG. 4.
Figure 6:
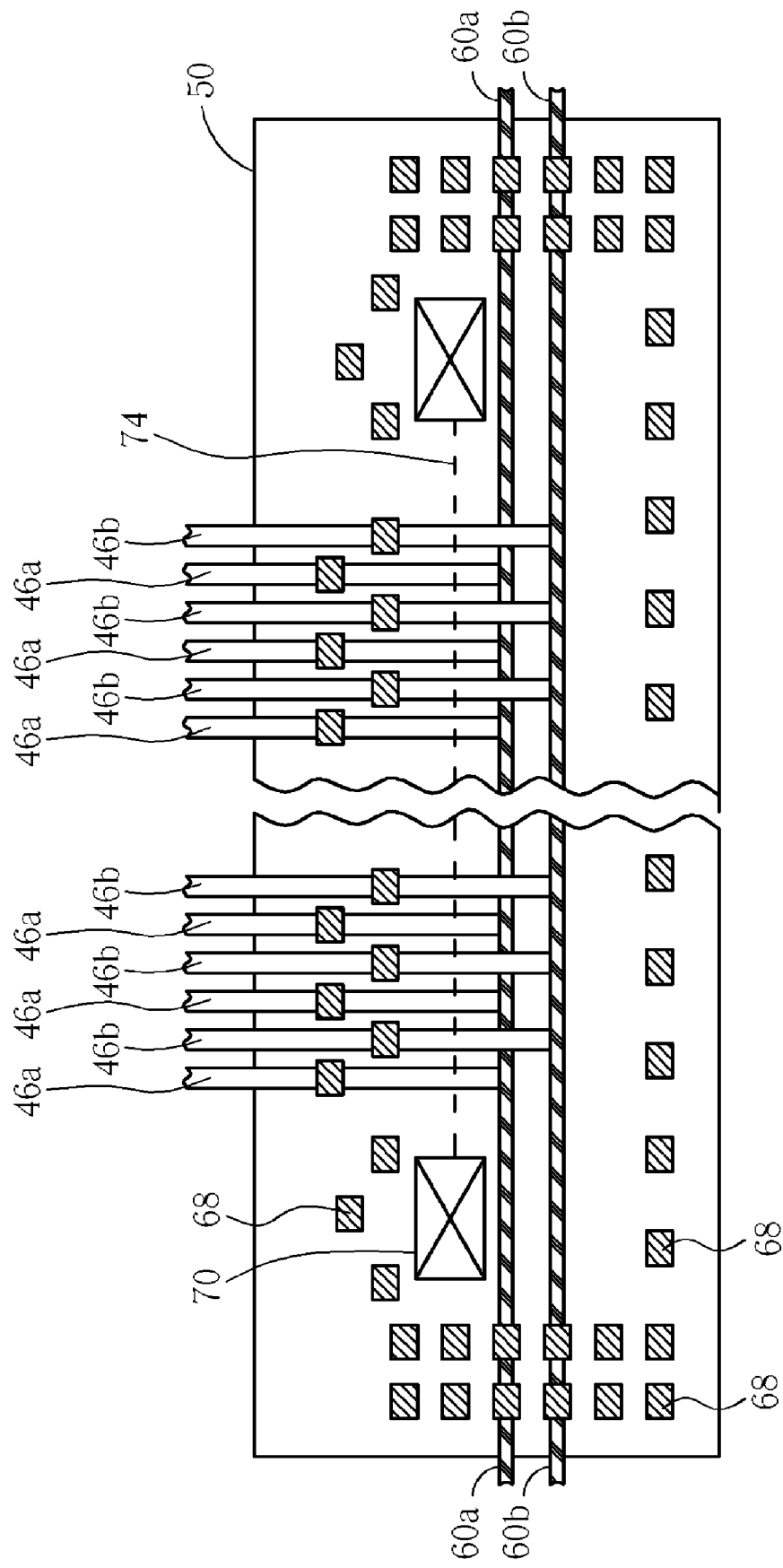
FIG. 6 is an internal schematic diagram of the scanning line driving IC mounting area in FIG. 4.

As shown in FIG. 4, the bottom substrate includes at least one scanning line driving IC mounting area 52 for installing a scanning line driving IC (not bonded on the bottom substrate 42 yet). As shown in FIG. 5, the data line driving IC mounting areas 52 include a plurality of bonding pads 64 and at least two standard align marks 66, and the scanning line driving IC mounting area 50 includes a plurality of bonding pads 68 and at least two align marks 70 as shown in FIG. 6.

Furthermore, as shown in FIG. 4 and FIG. 5, the liquid crystal display 40 includes another shorting bar 54a positioned on the bottom substrate 42 and connected to all of the data lines 48R, a shorting bar 54b positioned on the bottom substrate 42 and connected to all of the data lines 48G, and a shorting bar 54c positioned on the bottom substrate 42 and connected to all of the data lines 48B. Moreover, as shown in FIG. 4, the liquid crystal display includes a plurality of test pads 56a, 56b and 56c positioned on the bottom substrate 42, and one end of each of the shorting bars 54a, 54b and 54c is respectively connected to the test pads 56a, 56b and 56c, and the other ends of the shorting bars 54a, 54b and 54c are electrically connected to a flexible printed circuit 58. The flexible printed circuit 58 is shown as a dotted line since it has not been positioned on the bottom substrate. However, FIG. 4 does not limit the location of the flexible printed circuit 58. The flexible printed circuit 58 can connect to the shorting bars 54a, 54b and 54c at the area A, area B and area C as required. Furthermore, as shown in FIG. 4 and FIG. 6, the liquid crystal display 40 includes another shorting bar 60a installed on the bottom substrate 42 and connected to all of the scanning lines 46a, and shorting bar 60b positioned on the bottom substrate 42 and connected to all of the scanning lines 46b, and one end of each shorting bar 60a and 60b is connected to the test pads 62a and 62b.

It is noted that each shorting bar 54a, 54b, 54c, 60a and 60b is for carrying out a cell test to inspect whether liquid crystal display 40 contains any unusual phenomenon. The following is a description of this test method. As shown in FIG. 4, firstly, a test equipment (ex: probe) inputs a test signal S1 to the test pads 62a and 62b, and the test signal S1 will pass through each shorting bar 60a and 60b to turn on the gates on each scanning line 46a and 46b. In the meantime, the test equipment inputs a test signal S2 to the test pad 56a, the signal S2 will pass through the shorting bar 54a to each data line 48R to make each red dot pixel on the data line 48R display red color, and the operator checks whether any unusual red defect exists (ex: dark point or mula). After each red dot pixel of the LCD 40 is checked, the test equipment stops outputting signal S2 to the test pad 56a and outputs a signal S3 to the test pad 56b, the test signal S3 will pass through the shorting bar 54b to each data line 48B to make each green dot pixel on the data line 48B display green color, and thereafter the operators can inspect whether any unusual green defect exists. After each green pixel is checked, the test equipment stops outputting test signal S3 to the test pad 56b and outputs a signal S4 to the test pad 56c to make each blue pixel on the data line 48B display blue color, and thereafter the operator inspects each blue pixel to make sure if any unusual defect exists. It should be understood that the aforementioned test order is an illustration, in other words, the test order between red dot pixels, blue dot pixels, and green dot pixels can be adjusted according to each testing situation.

In addition, as shown in FIG. 4, this cell test invention includes the following test steps. First of all, the test equipment outputs a signal S1 to test pads 62a and 62b. The test signal S1 will pass through the shorting bars 60a and 60b to turn on the gates on each scanning line 46a and 46b. After that, the test equipment inputs test signals S2, S3 and S4 to the test pads 54a, 54b and 54c simultaneously, and the test signals S2, S3 and S4 will separately pass through the shorting bars 54a, 54b and 54c to the data lines 48R, 48G and 48B to make the red, green and blue dot pixels display different colors. However, due to the color filter, the liquid crystal display 40 displays a black image, and the operator checks the image of liquid crystal display 40. Afterward, the test equipment stops outputting test signal Si to the test pad 62b to make the liquid crystal display 40 reveal a gray image, meanwhile the operator rechecks the image of liquid crystal display 40. Finally, the test equipment stops outputting the test signal to the test pad 62a to make the liquid crystal display 40 display a white image and the operator checks the image of the liquid crystal display 40.

It is noted that the data lines 48R, the data lines 48G, and the data line 48G in the invention connect to different shorting bars. Hence the operator can individually inspect each revealed color image of red dot pixels, green dot pixels and blue dot pixels. On the other hand, the invention connects the scanning lines 46a and the scanning lines 46b to different shorting bars. Therefore it can be directed to the individual cell test of black, gray and white images and the operator can collect the more comprehensive defect information for analysis.

As shown in FIG. 5, when the cell test is completed, a cutting process is performed. The cutting process uses the align mark 66 to level the position and a laser to cut off the connection between each shorting bar and each data lines along the dotted line 72. Identically, as shown in FIG. 6, the cutting process uses the align mark 70 to level the position and a laser to cut off the connection between the shorting bar and each scanning line.

When each scanning line/data line connection is cut off, a chip-on-glass (COG) package technique is used to bond each data line driving IC on the data line driving IC mounting area 52, i.e. each data line driving IC is bonded to each bonding pad 64 in FIG. 5, and the bonding pads 64 without being located on the data lines 48R, 48G and 48B, which are bonded with the data line driving ICs, are respectively electrically connected by the shorting bars 54a, 54b, or 54c. Thereafter the aforementioned scanning line driving ICs are installed on the scanning line driving IC mounting area 50, and each scanning line driving IC is bonded on the each bonding pad 68 by COG as shown in FIG. 6, wherein each scanning line driving IC is for outputting clock signals to each scanning line 46a and 46b, each data line driving IC is for outputting image information signals to each data line 48R, 48G and 48B. The bonding pads 68 without being located on the scanning lines 46a and 46b, which are bonded with the scanning line driving ICs, are respectively electrically connected by the shorting bars 60a or 60b.

It is noted that after each data line driving IC is bonded on the data line driving IC mounting areas 52, the shorting bars 54a, 54b and 54c are used to connect the data line driving ICs through the bonding pads 64. Therefore the signals from the flexible printed circuit 58 can pass through the shorting bars to each individual data line driving IC to make each data line driving IC output image information to each data line 48R, 48G and 48B. In other words, in this invention, the shorting bars 54a, 54b and 54c are for performing cell tests in advance. After the cell test, the shorting bars 54a, 54b and 54c are used to connect to the data line driving IC. Therefore, the present invention shorting bars 54a, 54b and 54c can be used to perform the cell test and connect to the data line driving ICs so that it can reduce the number of conductive wires and reach the objective of saving space. Moreover, when the data line driving IC operation is mistaken, each test pad 56a, 56b and 56c can be used to test the data line driving ICs to find the bugs. In other words, the test pads in the present invention 56a, 56b and 56c are used to perform crystal display cell tests in advance. When the test is completed, the test pads 56a, 56b and 56c can be used to test each data line driving IC. Therefore, the invention can not only reduce to number of test pads but can also solve the aforementioned problem in which there is not enough space for setting test pads needed for the shorting bars.

Figure 7:
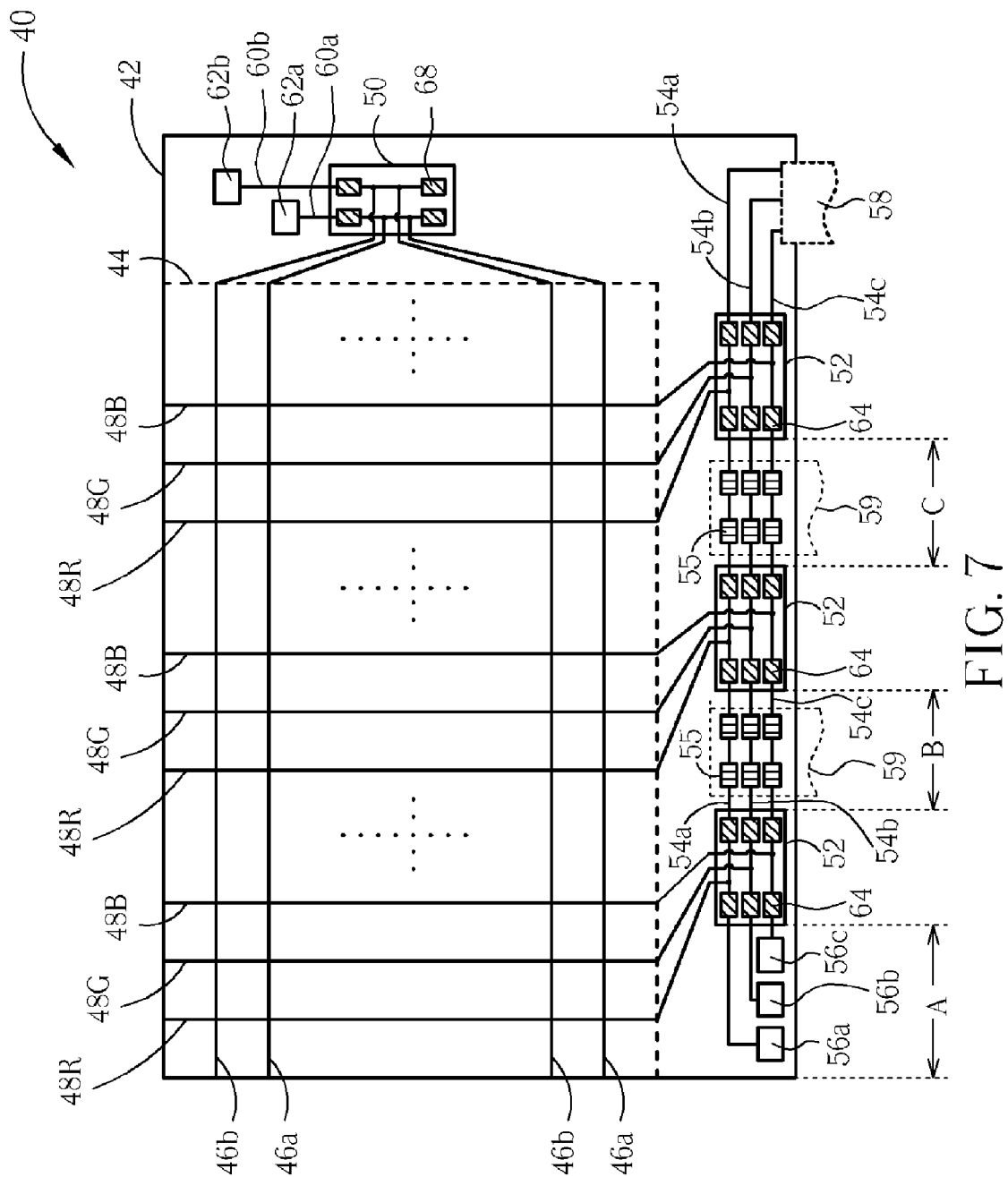
FIG. 7 is a schematic diagram of a liquid crystal display according to the second embodiment of the present invention.

FIG. 7 is one of the schematic diagrams of the second embodiment. For convenient description, the same marks are used for the same devices. As shown in FIG. 7, the LCD 40 includes another plurality of power bonding pads 55 positioned between two neighboring data line driving IC mounting areas 52 and connected to the shorting bars 54a, 54b and 54c. Generally, when the scale of the LCD becomes larger and larger, as result of the equivalent resistance of each shorting bars 54a, 54b and 54c, the signal strength outputted from flexible printed circuit 58 will decrease along the shorting bars 54a, 54b and 54c. In order to reduce this phenomenon, the second embodiment of the invention attaches other flexible printed circuits 59 to the power bonding pads at the area B and area C, and the flexible printed circuits 59 can output control signals to each corresponding data line driving IC to strengthen the signal from the flexible printed circuit 58.

In addition, the described LCD 40 comprises a scanning line driving IC mounting area 50. However, it should be understood that the invention is not limited, and the number of scanning line driving ICs mounting area 50 can be changed according to the realistic product requirements. The described data line driving IC mounting area 52 relative design can also be applied to the scanning line driving IC mounting area 50, and the number and the position of the described data line driving IC mounting areas, scanning line driving IC mounting areas, shorting bars, bonding pads and test pads can be changed according to the realistic product requirement not limited by FIG. 4 and FIG. 7.

Compared with the prior art, accordingly, the data line 48R, 48G, and 48B in the present invention are individually connected to different shorting bars, the invention can inspect red dot pixels, green dot pixels and blue dot pixels separately to gain the more complete defect information. Furthermore, the preferred shorting bars 54a, 54b, and 54c are used to perform cell tests and connect the data line (or power line) driving ICs so that the invention can reduce the number of conductive wires to reach the objective of saving place. On the other hand, the test pads 56a, 56b and 56c can be used to perform both the cell test and the driving IC test. It can not only reduce the number of test pads but also solve the problem of lack of space for setting test pads of shorting bars.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of producing a liquid crystal display with a cell test structure, comprising:
    providing a first substrate and a second substrate, the first substrate including a plurality of first conductive wires disposed on the first substrate in parallel, and a first shorting bar connected to each first conductive wire;
    performing a liquid crystal cell test by using the first shorting bar;
    performing a cutting process to cut off the connection between the first shorting bar and each first connective wire;
    locating a plurality of first driving integrated circuits (ICs) on the first substrate; and
    connecting the first driving ICs in series through the first shorting bar, wherein each first driving IC is used to output a signal to the first conductive wires.

2. The method of claim 1 further comprising providing a first data line transmitting red image signals.

3. The method of claim 2, wherein the first substrate further includes a plurality of second data lines transmitting green image signals and a plurality of third data lines transmitting blue image signals, a second shorting bar connected to each second data line and a third shorting bar connected to each third data line.

4. The method of claim 3, wherein the first substrate further includes:
    a plurality of first scanning lines;
    a plurality of second scanning lines in parallel and interlaced with the first scanning lines;
    a fourth shorting bar connected to each first scanning line; and
    a fifth shorting bar connected to each second scanning line.

5. The method of claim 4, wherein the liquid crystal cell test comprises:
    inputting a first test signal to the fourth shorting bar and the fifth shorting bar simultaneously;
    inputting a second test signal to one of the first shorting bar, the second shorting bar, and the third shorting bar; and
    checking the image on the liquid crystal display.

6. The method of claim 4 wherein the liquid crystal cell test comprises:
   inputting a third test signal, a fourth test signal, and a fifth test signal to the first shorting bar, the second shorting bar, and the third shorting bar; and
   checking the image on the liquid crystal display.

7. The method of claim 6 wherein the liquid crystal cell test further comprises providing a sixth test signal input to the fourth shorting bar.

8. The method of claim 7 wherein the liquid crystal cell test further comprises providing the sixth test signal input to the fifth shorting bar.

9. The method of claim 4 wherein the cutting process comprises:
   disconnecting the connection between the second shorting bar and each second data line;
   disconnecting the connection between the third shorting bar and each third data line;
   disconnecting the connection between the fourth shorting bar and each first scanning line; and
   disconnecting the connection between the fifth shorting bar and each second scanning line.

10. The method of claim 1, wherein the step of locating the first driving ICs comprises bonding the first driving ICs to a plurality of bonding pads on the first substrate, and the bonding pads are electrically connected to the first shorting bar.

11. The method of claim 1, further comprising:
    connecting a flexible printed circuit to the first shorting bar, and inputting a signal to the first driving ICs through the flexible printed circuit and the first shorting bar.

12. The method of claim 1, wherein the first substrate includes a plurality of power bonding pads located on the first shorting bars between the adjacent first driving ICs.

13. The method of claim 12, further comprising:
    attaching a flexible printed circuit to the power bonding pads between the adjacent first driving ICs, and inputting a signal to the first driving ICs through the flexible printed circuit, the power bonding pads, and the first shorting bar.

* * * * *

UNITED STATES PATENT AND TRADEMARK OFFICE
CERTIFICATE OF CORRECTION

| | | |
|---|---|---|
| PATENT NO. | : 7,605,904 B2 | Page 1 of 1 |
| APPLICATION NO. | : 12/110355 | |
| DATED | : October 20, 2009 | |
| INVENTOR(S) | : Hsin-Tai Wu et al. | |

It is certified that error appears in the above-identified patent and that said Letters Patent is hereby corrected as shown below:

Claim 1, column 6, line 38, replace "connective" with --conductive--.

Signed and Sealed this
Fourteenth Day of February, 2012

David J. Kappos
*Director of the United States Patent and Trademark Office*